United States Patent [19]

Gallas

[11] Patent Number: 4,536,613

[45] Date of Patent: Aug. 20, 1985

[54] CLAMP BUSHING FOR SECURING AN ELECTRICAL CABLE TO AN ELECTRICAL OUTLET BOX

[75] Inventor: Gunter A. Gallas, New Hyde Park, N.Y.

[73] Assignee: Slater Electric Inc., Glen Cove, N.Y.

[21] Appl. No.: 430,475

[22] Filed: Sep. 30, 1982

[51] Int. Cl.³ .............................................. H05K 5/02
[52] U.S. Cl. .................................... 174/65 R; 285/159
[58] Field of Search ............. 174/65 R; 285/158, 159, 285/162, 195

[56] References Cited

U.S. PATENT DOCUMENTS

| | | |
|---|---|---|
| 1,106,761 | 8/1914 | Weikert et al. |
| 1,243,748 | 10/1917 | McMurtrie. |
| 1,418,990 | 6/1922 | Thomas, Jr. .................. 285/162 |
| 1,475,524 | 11/1923 | Thomas, Jr. |
| 1,793,884 | 2/1931 | Church ........................ 285/195 |
| 2,643,136 | 6/1953 | Schesser ...................... 285/159 |
| 2,973,212 | 2/1961 | Rose ........................ 174/65 R X |
| 3,174,776 | 3/1965 | Berger ........................ 285/162 |
| 3,183,297 | 5/1965 | Curtiss . |
| 3,556,566 | 1/1971 | Bromberg . |
| 3,746,373 | 7/1973 | Prudente . |

Primary Examiner—A. T. Grimley
Assistant Examiner—D. A. Tone
Attorney, Agent, or Firm—Morgan, Finnegan, Pine, Foley & Lee

[57] ABSTRACT

A cable clamp assembly comprises a bushing member adapted to receive an electrical power cable, tubing or the like, has a pair of jaw members adapted to fit through a cable entry port in the wall of an outlet box. One jaw is fixedly secured to the bushing while the other is formed on a movable arm member. A lug portion of the bushing provides a cavity which serves as a guide for travel of the arm and a threaded fastener passes through the lug and threadably engages the arm to move the arm. A biasing member associated between the bushing and the screw urges the arm member away from the fixed jaw. The biasing means may be generally U-shaped and located generally over the lug, with the free ends of its leg portions abutting the exterior of the bushing member and an aperture in its base portion to receive the screw. Alternatively, the biasing member may be a relatively flat resilient member affixed at one end to the exterior of the bushing and spaced from the bushing at its other end which is formed with a hole to receive the fastener. The flat biasing member may, instead, be affixed at one end to the interior of the bushing while its other end abuts the shank end of the screw.

10 Claims, 8 Drawing Figures

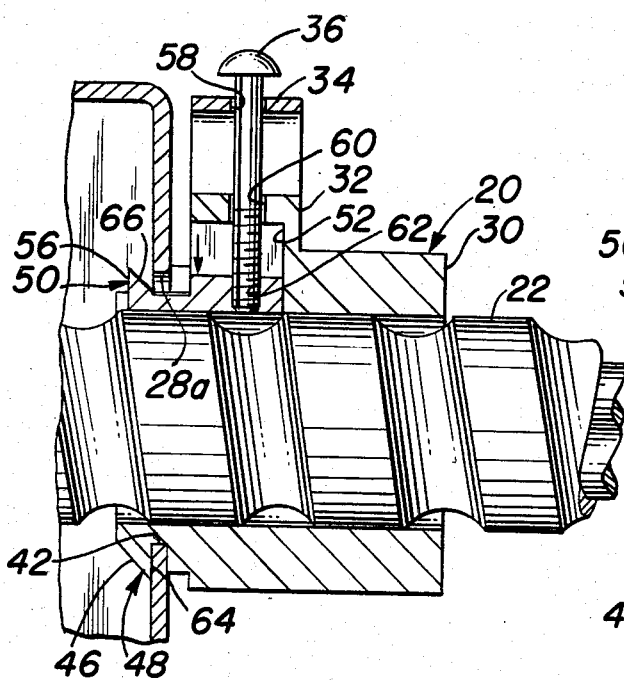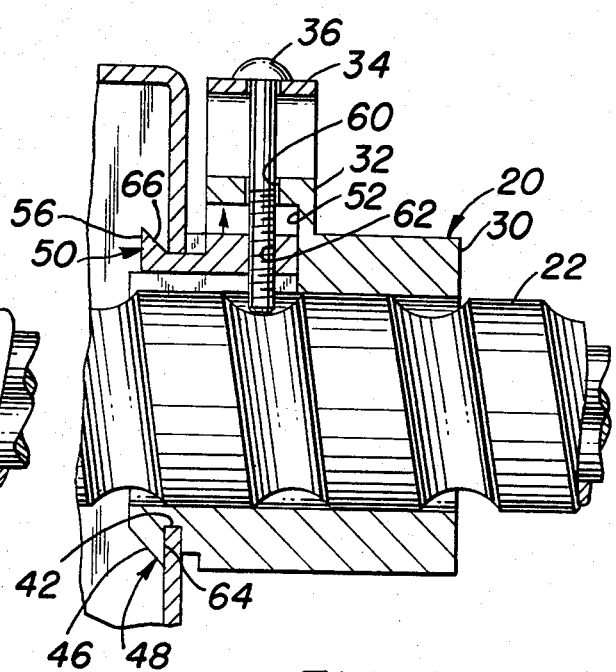
FIG. 3  FIG. 4
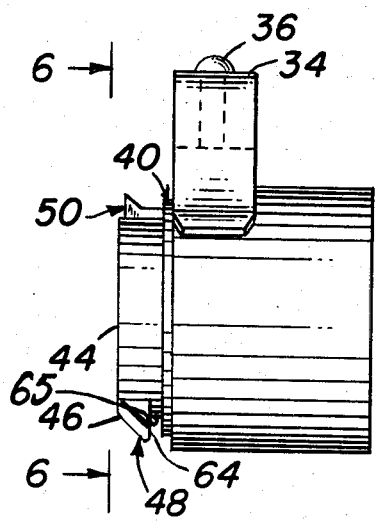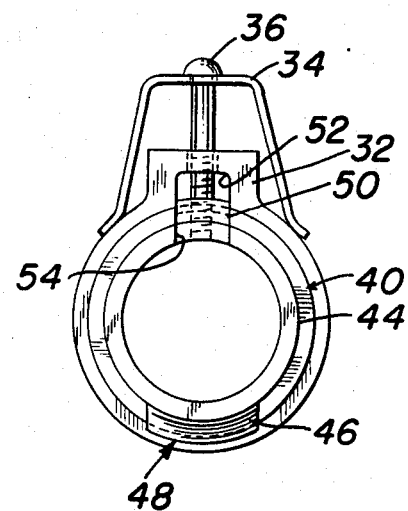
FIG. 5  FIG. 6

CLAMP BUSHING FOR SECURING AN ELECTRICAL CABLE TO AN ELECTRICAL OUTLET BOX

BACKGROUND OF THE INVENTION

This invention relates generally to clamping devices for securing an electrical power cable to an electrical junction box to prevent any strain on the cable from being transmitted to its connection to a wiring device.

Electrical power cables are, of course, well known for their use in homes, buildings and other structures to distribute electric power throughout the structure and thereby provide power for lighting, appliances, heating and other similar purposes. Such electrical cables are usually concealed within the walls and ceilings of the structure, with numerous cable segments coupling the various electrical wiring devices (switches, receptacles, etc. housed in outlet boxes) to each other and to the power source.

Because of the number of connections required to couple all of the wiring devices to the source of electrical power, it is important, from the standpoint of safety and reliability, that the connection between each cable segment and any wiring device be made with sufficient strength to prevent separation (or even loosening) of the cable from the wiring device. The need for such strength is particularly important during construction when the cable segments are installed and terminated to the wiring devices. During such installation, the electrician often has to pull on a cable segment, thereby risking disconnection of the other cable end from the wiring device to which it is terminated.

Cable clamps have been developed for insertion in or adjacent cable entry ports in the electrical outlet box containing a wiring device to be connected to an electrical power cable. These cable clamp devices permit the cable to pass into the outlet box for termination to the wiring device, and, once in place, to be secured relative to the outlet box. If a force is then exerted on the cable tending to strain or break the connection with the wiring device, the force is transmitted to and absorbed by the box rather than the electrical connection.

Although these devices provide adequate results in certain applications, they can suffer certain drawbacks. For example, some known clamps (such as shown in U.S. Pat No. 2,973,212) are formed with a lip or jaw for mating with the opening in the box, and include a member made of resilient or spring-like material to permit the clamp to be inserted into the opening with a snap action. Such spring-like structures are subject to deformation if excessive force is applied and are thus capable of providing limited clamping force.

Another common clamp device comprises a bushing insert which has a threaded end adapted to project through a cable entry port. The insert is held in place by a threaded washer screwed onto the threaded end, with a tap screw extending through the insert wall to secure the cable in place after it is installed in place. Thus, the insert requires the additional steps of fully installing the bushing in the opening followed by turning down the screw.

In spite of the long felt need for an economical clamp which can be installed quickly yet is capable of providing substantial clamping strength, no known commercially available clamp adequately meets both criteria.

Accordingly, it is an object of the present invention to provide a new and improved cable clamp member for securing an electrical power cable or tubing to an outlet box or the like. It is also an object of the invention to provide a cable clamp member which is easy to install for minimum installation time yet provides a reliably secure attachment to the box.

Another object of the present invention is to provide a cable clamp member for clamping an electrical cable or tubing to an electrical outlet box or the like, which can be re-used without the risk of weakening or damaging any parts.

The aforementioned problems are overcome, and the foregoing and other objects and advantages are achieved by the cable clamp member of the present invention which is adapted to secure an electrical cable or conduit to a junction box.

SUMMARY OF THE INVENTION

In accordance with the invention, a cable clamp assembly comprises a bushing member adapted to receive an electrical power cable, tubing or the like and a pair of jaw members adapted to fit through a cable entry port in the wall of an outlet box. One jaw is fixedly secured to a lip portion of the bushing member, while the other jaw is formed on an arm member which is adapted to be moved towards and away from the fixed jaw. The bushing member also includes a lug portion (preferably formed integrally therewith) having a cavity therein which serves generally as a guide for travel of the arm. A screw, functioning as a jack screw, passes through the lug but threadably engages the arm, and a biasing member is operatively coupled between the bushing and the screw to urge the arm member away from the fixed jaw.

In one embodiment, the biasing means is generally U-shaped and is located generally over the block member, with the free ends of its leg portions abutting the bushing member and an aperture in its base portion to receive the screw. In operation, the screw, with its head abutting the biasing member, is threaded into the arm member, thereby causing the arm to move radially outwardly away from the fixed jaw. The jaws continue to diverge until they abut diametrically opposite portions of the rim of the box opening. Thereafter, further turning of the screw results in compression of the biasing member, causing the shank end of the screw to advance against the outer jacket of the cable and urge the cable against the interior wall of the bushing. The two jaws, thus, securely hold the bushing to the junction box and the screw secures the cable to the bushing, independently of the biasing member.

In an alternate embodiment (particularly useful in clamping electrical metallic tubing), the biasing member may be a relatively flat resilient member affixed at one end to the exterior of the bushing and spaced from the bushing at its other end which is formed with a screw-receiving through-hole. In still another embodiment (useful in clamping non-metallic sheathed cable), the biasing member is a relatively flat resilient member which is affixed at one end to the interior of the bushing while its other end abuts the shank end of the screw.

It will be appreciated from the foregoing, as well as the detailed description set forth below, that the objects and advantages specifically mentioned above are achieved by the cable clamp member according to the invention. For example, it will be appreciated that the cable clamp member according to the invention is easy to install in a cable entry port or like opening yet permits a cable or tubing to be securely clamped to the box. It, thus, facilitates quick installation yet provides a reliable and secure attachment in a virtually one-step operation.

In addition, it will be understood that the cable clamp member according to the invention can be disengaged from the box and the cable or tubing removed, if desired, in order to permit adjustments during the overall wiring operation. Similarly, it permits inspection and replacement of the clamped cable or tubing.

BRIEF DESCRIPTION OF THE DRAWINGS

The aforementioned aspects and other features of the invention are explained in the following description taken in connection with the accompanying drawings wherein:

FIGS. 3 and 4 are sectional views of the clamp member (With the cable shown in full), both taken along the lines 3—3 of FIG. 2, showing the configuration of the clamp prior to clamping (FIG. 3) and after clamping (FIG. 4);

FIG. 5 is a side elevation view of the embodiment of the clamp member shown in FIG. 1;

FIG. 6 is a front elevation view taken along lines 6—6 of FIG. 5;

DETAILED DESCRIPTION OF A PREFERRED EMBODIMENT

Figure 1:
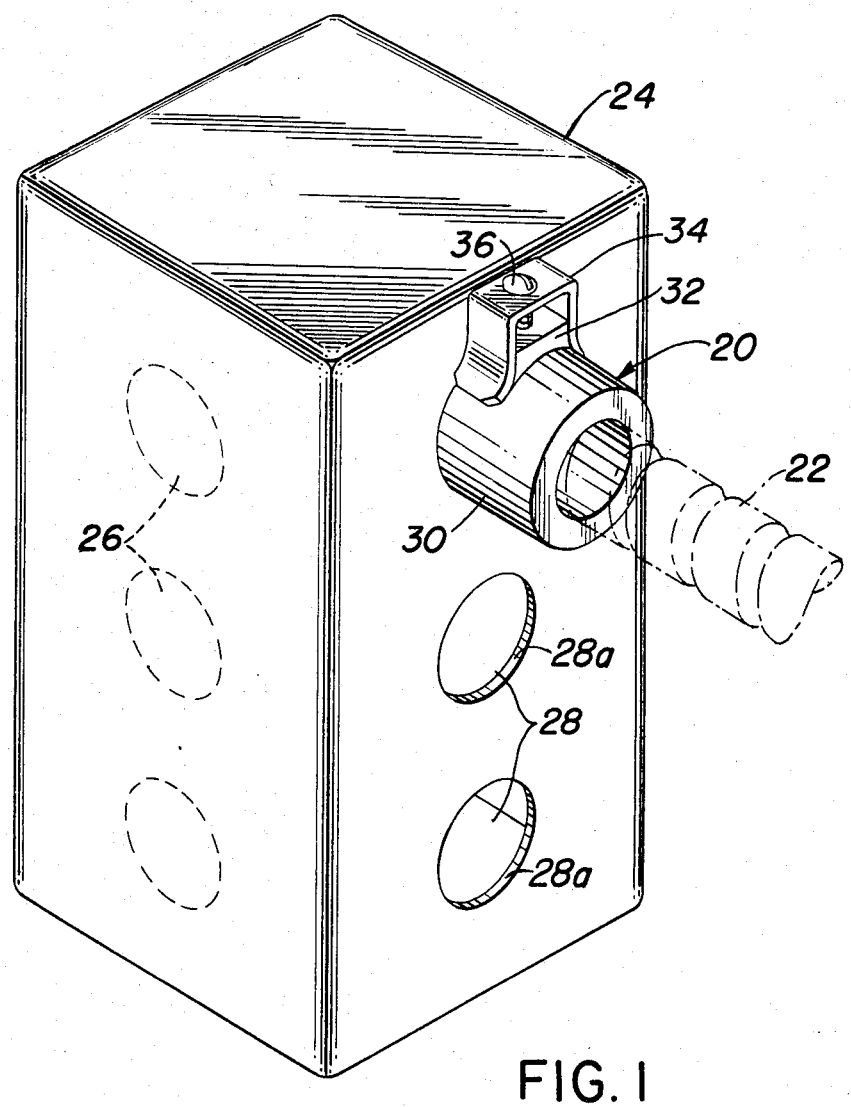
FIG. 1 is a stylized isometric view of a junction box, from a back corner, showing an electrical power cable secured at a cable entry port by a cable clamp member constructed in accordance with the invention.
Figure 2:
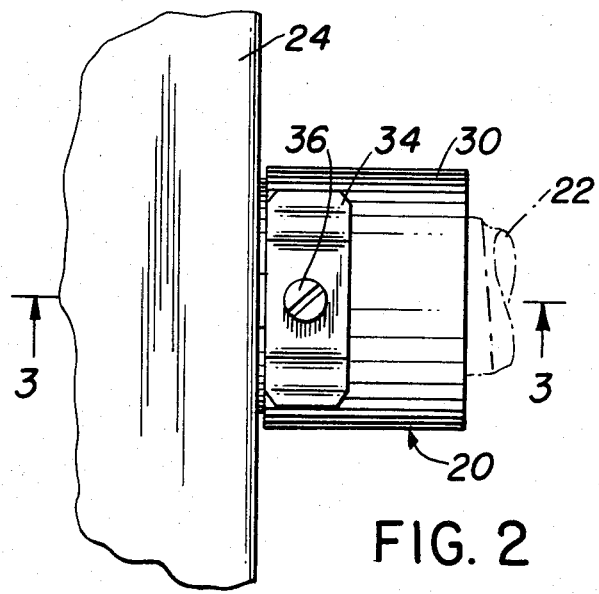
FIG. 2 is a top plan view of part of the box, clamp member and cable of FIG. 1.

Referring now generally to FIGS. 1-6, a cable clamp device 20 made in accordance with the present invention is shown securing an electrical power cable 22 to a junction, or outlet, box 24. The box 24 is constructed in a conventional manner of a metal such as steel, or other suitable material, and includes removable closure members 26 closing cable entry ports 28. Clamp 20 is adapted to be secured to a cable entry port 28 and attach cable 22 to the box 24. (The cable 22, shown here, is in the form of electrical cable known as "BX" cable having a metallic electrically conductive outer sheath.)

In accordance with the invention, clamp 20 includes a bushing portion 30 into which an end of cable 22 is inserted. A lug portion 32 is formed on bushing 30, preferably integrally therewith, and a generally U-shaped biasing member 34 (preferably made of a resilient material such as spring steel) is disposed outside lug 32, with a screw 36 passing through an opening (described below) formed in member 34 and an opening in lug 32.

As best shown in FIGS. 3-6, one end of bushing 30 terminates in bezel-like portion 40 which is adapted to abut the box wall adjacent the rim 28a of a port 28. A lip 44 extends beyond bezel portion 40 to project through the port 28. A tooth-like member 46 depends from a portion of lip 44 to form a fixed jaw (indicated generally at 48) adapted to grip the rim 28a within recess 65 formed by member 46, lip 44 and the front of the bushing member.

A movable arm 50 resides in cavity 52 formed within the radially outwardly offset lug 32 and is adapted to threadably receive the shank portion of screw 36. A portion of arm 50 extends through slot-like opening 54 formed at the front end of lug 32, terminating in a jaw 56 adapted to grip rim 28a. An unthreaded through-hole 58 in the member 34 and a similar through-hole 60 in lug 32 permit non-threaded receipt of the screw 36 therethrough, while threaded hole 62 in arm 50 permits threaded engagement between screw 36 and arm 50. Hole 62 also permits the screw to pass through arm 50 to contact the outer braid, or sheath, of cable 22, as will be described more fully below.

In operation, the front end of bushing member 30 (i.e., the end with jaws 48 and 56) is first inserted in opening 28 of the box 24 with the two jaws adjacent opposite rim portions of the port. The end of cable 22 is then inserted through bushing 30 to pass into the interior of box 24 (FIG. 3) and the screw is tightened down both to secure the clamp to the box and to grip the cable within the bushing.

To facilitate insertion of the cable, screw 36 can first be unthreaded to retract its shank end within hole 62 in arm 50. Any tension in biasing member 34 will thus be reduced, and the arm 50 should be somewhat free to move radially inwardly so that the jaws 56 and 48 can clear the rim 28a when inserted into the port 28. If necessary, movable jaw 56 can be manually drawn toward fixed jaw 48 to clear the rim 28a, since biasing members 34 will force it back and into at least partial engagement with the cable entry port rim.

When clamp 20 is properly located in port 28, lip 44 with its flange 46 (forming the fixed jaw 48) and movable jaw 56 will extend into the box 28 and abut an interior surface of the box. The bezel portion 40 abuts the outer surface of box 24 adjacent rim 28a to prevent further inward movement of the bushing.

Once the jaws 48 and 56 are located within port 28 and the cable is located within the bushing portion (FIG. 3), screw 36 is tightened down into arm 50. As the screw is tightened, its head bars against the biasing member to draw movable jaw 56 against the rim, while the bottom surface of the jaw 48 is urged against the diametrically opposite edge of the rim 28a. Further tightening of screw 36 results in a radially inward movement of the shank end of the screw against the sheath of cable 22 (since arm 50 effectively becomes stationary), while the head of screw 36 compresses biasing member 34. When fully tightened, screw 36 thus urges the cable against the opposite interior wall portion of bushing 30, both to secure the clamp member to the cable entry port and to clamp the cable securely within the bushing, as shown in FIG. 4.

As preferably embodied, jaws 48 and 56 have a slightly curved contours (as shown in FIG. 6) to facilitate engaging the round rims 28a of port 28, although they can be adapted to engage cable entry ports of various configurations and walls of different thicknesses. In addition, mating surface 64 on the fixed jaw 48 is parallel to the plane of the port 28 to resist removal by any outwardly-directed force exerted on clamp 20 and forms recess 65 (FIG. 5) which receives a portion of rim 28a. The corresponding surface 66 of the movable jaw 56 is inclined relative to the plane of the opening 28 so as to facilitate drawing bezel 40 into abutting relation with the box wall surface adjacent the opening 28 during initial tightening of screw 36.

As here embodied and as best shown in FIG. 6, biasing member 34 is generally U-shaped, having a flat base portion (in which opening 58 is formed) with two outwardly diverging leg portions, each leg having a further outwardly flaring end segment to "slide" along the outer surface of bushing portion 30. Thus, as screw 36 is tightened, the base portion is urged towards lug 32 while the flared end segments slide along the outer surface of bushing 30, spreading the leg portions apart resulting in a biasing action on screw 36.

The vertical sides of the arm 50 are co-planar with the corresponding side wall surfaces of the cavity 52, which thereby serve to guide the arm 50 as it moves radially inwardly and outwardly. The through-holes 58 and 60, in conjunction with the threaded bore 62 of the arm 50, similarly serve to guide the screw 36 when turned and aid in retaining the screw 36 and the arm 50 in proper relative positions when turned. The outer surface of the flange 46 may be inclined relative to the axis of the bushing 30 to facilitate inserting the flange 46 through the opening 28.

Figure 7:
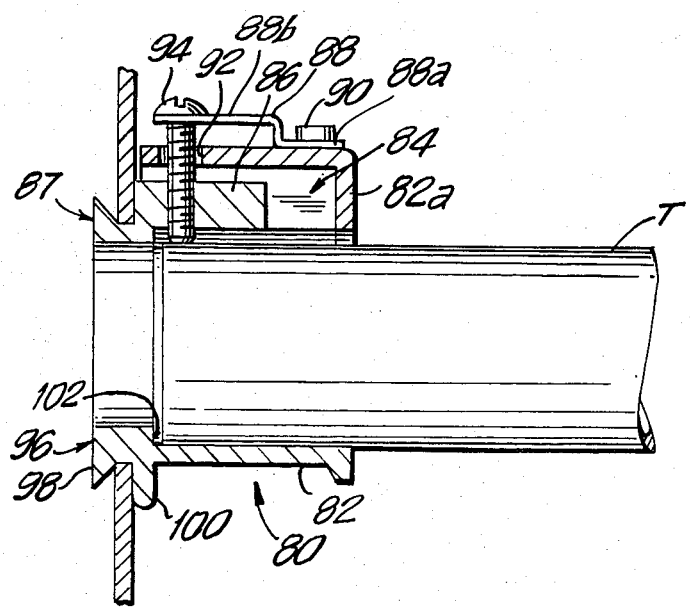
FIG. 7 is a view similar to FIG. 4 of a modified embodiment of the present invention which is particularly useful for clamping electrical metallic tubing to an outlet box.

Turning now to FIG. 7, there is shown an alternate embodiment (indicated generally at 80) of a clamping device according to the present invention. This embodiment is particularly useful for clamping electrical metallic tubing (T) to the box, at a cable entry port 28. Although the general configuration of the clamp device 80 may be generally the same as that shown in FIGS. 1-6, certain useful differences are incorporated in the embodiment of FIG. 7 to illustrate variations which can be made in the invention.

Clamp 80 includes bushing portion 82 having an opening to receive an end of tubing T and an axially offset lug portion 82a which provides a chamber 84 for movable arm member 86. A biasing member 88 is fixedly attached at its off-set end 88a, as by rivet 90 (or by a weld or like fastening means), to the exterior of the offset lug portion 82a, with its longer leg portion 88b located adjacent through-hole 92 formed in the lug. Hole 92 is adapted to permit unthreaded passage of screw 94 (similar to screw 36). Screw 94 is threadably received in a threaded hole (not numbered) formed in movable member 86 which is essentially the same as movable member 50 of FIGS. 1-6. The fixed jaw portion 96 of clamp 80 is essentially the same as fixed jaw 48 of FIGS. 1-6 except that the jaw member 98 is beveled like the jaw lip 87 of movable member 86 (to facilitate engaging the port rim), and the bezel is replaced by a simple flange member 100.

Operation of clamp 80 is generally similar to the clamp of FIGS. 1-6. The screw 94 is unthreaded sufficiently to permit the jaw members 87 and 98 to clear the rim of the cable entry port. Once the jaws are inside the box, the screw can be tightened down to draw movable arm 86 radially outwardly against the biasing member 88 until the jaws abut diametrically opposite portions of the cable entry port. The end of tubing T is then received inside bushing portion 82, or it may have been so located at any convenient point earlier during installation. (A ridge 102 may be provided in the interior of bushing portion 82 to limit insertion of the tubing into the clamp.)

Further tightening of screw 94 causes the end of its shank to progress in the radially inward direction. Once the shank end abuts tubing T and urges it against the opposite interior bushing wall, any additional tightening serves to increase the gripping force exerted by the pair of jaws 87 and 98 as well as the clamping force on tubing T. The final gripping and clamping forces are thus achieved in an essentially one-step operation.

Figure 8:
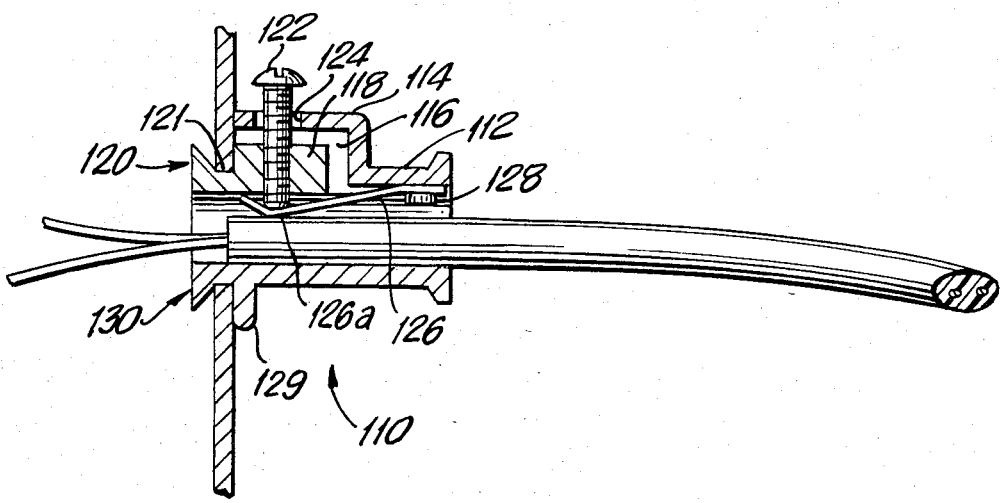
FIG. 8 is a view similar to FIG. 4 of still another embodiment of the present invention which is particularly useful for clamping non-metallic cable to an outlet box.

Turning then to FIG. 8, there is shown another embodiment (indicated generally at 110) of a clamp device according to the present invention, which is particularly useful for securing non-metallic sheathed cable to a box. Clamp 110 includes a bushing portion 112 and a lug portion 114 which defines a cavity 116 interior thereof to permit translation therein (in the radial direction) of movable arm member 118. Movable arm member 118 is substantially similar to movable members 50 and 86 described above and includes a jaw portion 120 having a recess 121 for engaging the rim of a cable entry port.

Screw 122 passes through unthreaded through-hole 124 formed in the top of lug portion 114, and threadably engages a threaded hole (not numbered) formed in movable arm 118. A biasing member 126 is affixed to an interior wall portion of the bushing portion adjacent lug portion 114, as by rivet 128 (or a weld or similar attaching means). Biasing member 126 includes a relatively short, flat segment attached to the bushing portion, and a longer middle segment which terminates in an upwardly projecting end segment to form a trough (indicated at 126a) for receiving and restraining the shank end of screw 122. The botton of bushing portion 112 includes flange 129 and jaw 130 (similar to flange 100 and jaw 98 described above) for engaging a rim portion of the cable entry port.

In operation, the jaws of clamp 110 are drawn together to permit insertion into the cable entry port so that the jaws reside on the interior of the box. (Biasing member 126 urges jaw 121 against the entry port rim.) The cable can be inserted within bushing 112 and screw 122 turned to draw movable member 118 toward the cable entry port rim while the shank end of screw 122 begins to project into the interior of bushing portion 112. As the shank end abuts the cable, further turning urges the movable arm 118 and the lower jaw 130 away from each other to provide a secure gripping force on opposite rim portions of the cable entry port, while wedging the cable against the opposite interior wall of the bushing member. It will be understood that by locating the biasing member adjacent the shank end of the screw, the risk of damaging the sheath of the cable is virtually eliminated.

It is to be understood that the above-described embodiments of the invention are illustrative only and that modifications thereof may occur to those skilled in the art. Accordingly, the invention is not limited to the specific embodiments disclosed herein, but variations and modifications may be made that are within the scope and spirit of the appended claims.

What is claimed is:

1. A clamp for securing an electrical distribution member such as an electrical power cable, electrical metallic tubing and the like to a junction box, comprising:
 a bushing member adapted to receive the distribution member to be secured to the box;
 a pair of jaws extending from said bushing, said jaws adapted to be inserted within a cable entry port in a wall of the box, one of said jaws being formed on an arm which is movable relative to said bushing member, and the other jaw being fixed to said bushing member;

guide means for guiding said arm during movement along a path transverse to the cable;

actuation means both for moving said jaws relative to each other to permit said jaws to grip the cable entry port along generally opposite rim portions thereof and for securing the distribution member to said bushing member, said actuating means including a threaded fastener threadably engaging said arm for moving said arm along said transverse path when said threaded fastener is turned, said threaded fastener having a head and a threaded shank; and biasing means associated with said bushing, said biasing means adapted to urge said movable arm away from said fixed jaw.

2. A clamp according to claim 1, wherein said guide means comprises a chamber within a lug portion formed on said bushing member.

3. A clamp according to claim 1, wherein at least one of said jaws has an engaging surface for contacting a rim portion of a cable entry port, said engaging surface being inclined to the axis of said bushing member for drawing said bushing towards said rim as said threaded fastener is tightened down.

4. A clamp according to claim 1, wherein said bushing member includes a lip portion supporting said fixed jaw.

5. A clamp according to claim 1, wherein said threaded fastener passes through a lug portion of said bushing member having an interior chamber which receives said arm member and acts as said guide means, said threaded fastener also threadably engaging said arm, said biasing means being associated between said bushing member and said threaded fastener for urging said threaded fastener away from the fixed jaw.

6. A clamp according to claim 5, wherein said biasing means comprises a generally U-shaped member having a base portion with a hole therein to permit insertion of said fastener shank, and a pair of legs depending from said base portion, said legs proportioned to engage said bushing member along an exterior surface portion thereof, such that as said threaded fastener is threaded into said arm member, said fastener head abuts said base portion to cause said legs to ride along the exterior surface of the bushing and resiliently spread apart to provide a biasing force against said threaded fastener which tends to urge said arm member away from said fixed jaw.

7. A clamp according to claim 6, wherein said legs taper away from each other at their free ends to facilitate riding along the exterior surface of the bushing.

8. A clamp according to claim 5, wherein said biasing means comprises a generally flat relatively elongate piece of resilient material attached at one end to an exterior portion of the bushing member so as to position its other end adjacent but spaced from said lug portion, with a hole formed in said other end to receive said threaded fastener, such that as said threaded fastener is threaded into said arm member said fastener head bears against said other end of said biasing means and urges it towards said lug portion to provide a biasing force on the threaded fastener which tends to urge said arm member away from said fixed jaw.

9. A clamp according to claim 5, wherein said biasing means comprises a generally flat relatively elongate piece of resilient material attached at one end to an interior portion of said bushing member with its other end adjacent the end of said fastener shank such that as said fastener is threaded through said arm member the shank end of the fastener urges said other end of said biasing means towards said fixed jaw to provide a biasing force on said fastener which tends to urge said arm member away from said fixed jaw.

10. A clamp according to claim 9, wherein said other end of said biasing means is formed with a trough-like portion adapted to receive the shank end of the fastener.

* * * * *